United States Patent [19]

Bogart, Jr.

[11] Patent Number: 4,918,442

[45] Date of Patent: Apr. 17, 1990

[54] AIRPLANE COLLISION AVOIDANCE SYSTEM

[76] Inventor: Donald W. Bogart, Jr., 5786 Campo Walk, Long Beach, Calif. 90803

[21] Appl. No.: 252,897

[22] Filed: Oct. 3, 1988

[51] Int. Cl.$^4$ .............................................. H04N 7/18
[52] U.S. Cl. ................................... 340/961; 340/945; 342/29; 358/103; 364/461; 382/1
[58] Field of Search ................. 340/945, 961; 342/29, 342/55; 358/103, 108; 364/461; 382/1, 8; 244/1 R

[56] References Cited

U.S. PATENT DOCUMENTS

| | | | |
|---|---|---|---|
| 3,053,932 | 9/1962 | Worst | 342/55 |
| 4,001,499 | 1/1977 | Dowell | 342/55 |
| 4,071,843 | 1/1978 | Marien | 342/55 |
| 4,277,170 | 7/1981 | Miles | 340/961 |
| 4,445,185 | 4/1984 | Davis, Jr. et al. | 364/514 |
| 4,581,762 | 4/1986 | Lapidus et al. | 382/8 |
| 4,602,336 | 7/1986 | Brown | 342/64 |
| 4,688,046 | 8/1987 | Schwab | 342/185 |
| 4,713,669 | 12/1987 | Shuch | 342/29 |
| 4,731,663 | 3/1988 | Kovalchick et al. | 358/106 |
| 4,779,095 | 10/1988 | Guerreri | 340/901 |
| 4,792,904 | 12/1988 | Reinagel et al. | 358/103 |
| 4,799,267 | 1/1989 | Kamejima et al. | 382/1 |
| 4,805,015 | 2/1989 | Copeland | 358/103 |
| 4,816,828 | 3/1989 | Feher | 340/945 |

Primary Examiner—Joseph A. Orsino
Assistant Examiner—Brent A. Swarthout
Attorney, Agent, or Firm—R. Juniper

[57] ABSTRACT

A collision avoidance system for airplanes particularly suited for clear weather visual circumstances which includes television cameras suitably positioned on an airplane to view all areas where there is a potential for collision with another airplane. The system includes an on-board television display in ready view of the pilot which is connected to a machine vision system predeterminedly programmed to respond to other flying objects which could present a collision hazard. The television cameras on the airplane are, in turn, connected to the machine vision system so as to transmit images to which it is responsive thereby causing an alert condition for pilot scrutiny.

2 Claims, 1 Drawing Sheet

AIRPLANE COLLISION AVOIDANCE SYSTEM

BACKGROUND OF THE INVENTION

Though, at first, collisions by aircraft while flying in clear skies would not seem to be significant, the contrary is often actually the real situation. Hazards exist even though there may not be bad weather or other obvious problems. Clear weather may lull pilots into believing that they can relax at such times. Thus, for instance, in order to avoid other airplanes it is necessary to constantly survey what can be seen in the entire frontal area above, on both sides, below and to the rear of the aircraft. However, due to aircraft structures such as wings and aft lower fuselage, large volumes of airspace are blocked from a pilot's view. Also, the cockpit workload of the pilot which includes checking charts, radio settings and gauge readings can draw attention and interfere with a pilot's normal visual scanning practice. Many mid-air collisions are a result of these problems.

Ground based radar can help but this is not available in many areas and heavy controller workload may cause pilots to go unnotified of potential collision hazards. Even in airspace where radar coverage can be provided, not all aircraft are in contact with the controller or capable of telling their altitudes. Thus, the controller may have no idea two aircraft are on a collision course.

SUMMARY OF THE INVENTION

In order to help solve these and other problems creating aircraft collision situations this invention has been developed. It includes a machine vision aircraft collision avoidance system operating to actuate an alarm to warn an aircraft pilot of the presence of air borne or other obstructions in the vicinity of an airplane's flight path.

Machine vision is a technology involving the use of television cameras to develop a computerized image of a visual scene. With computer programming methods, the image is processed so that particular objects, shapes and the like can be identified in the visual scene.

This invention uses machine vision technology in an airborne inspection system to constantly monitor the space around an aircraft for collision hazards, especially other aircraft and possibly to warn of birds, towers, wires, mountains and other obstacles. The invention consists of the installation of television cameras on physically prominent parts of an aircraft in order to give an unobstructed view for the cameras of the airspace around the aircraft. These cameras would provide television images to an on-board computer which would analyze the images for potential collision hazards.

DESCRIPTION OF PREFERRED EMBODIMENTS OF THE INVENTION

Figure 1:
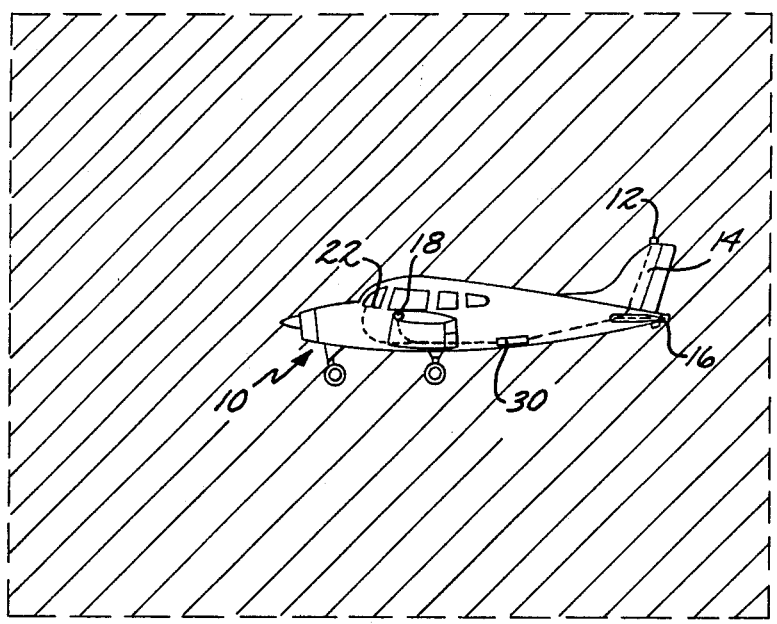
FIG. 1 is a left side view of an aircraft equipped with the necessary elements of a Machine Vision Aircraft Collision Avoidance System and shows the field of view to the left looking through a camera extending approximately 18 feet from the wingtip.
Figure 2:
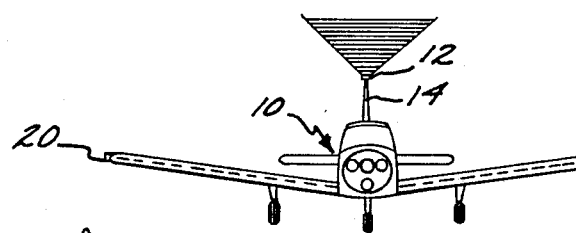
FIG. 2 is a front view of a Machine Vision equipped aircraft with the edges of the field of view shown 18 feet from wingtip. Line A—A in FIG. 2 is shown as the left edge of FIG. 1.
Figure 3:
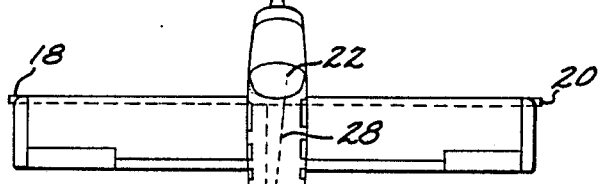
FIG. 3 is a plan view of the aircraft and FIG. 4 is a pilot's view of an aircraft dashboard equipped with a Machine Vision Aircraft Collision Avoidance System annunciator panel with controls.
Figure 4:
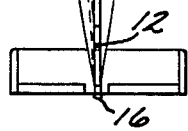
Figure 4:
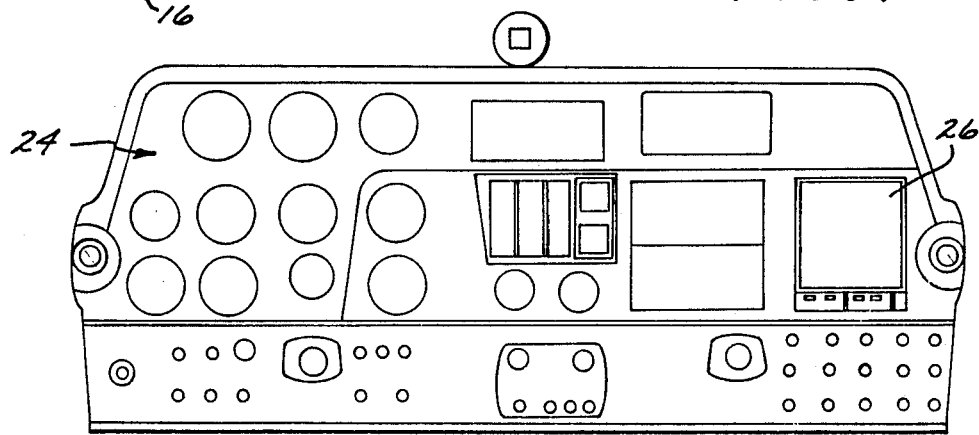

This invention consists of various television cameras mounted on prominent portions of an aircraft 10 exterior surface. For instance there is a camera 12 mounted on top of the vertical stabilizer 14 of the aircraft 10, a two-camera pod 16 mounted in the tail cone 16 for views of the aircraft aft and below, and a second two-camera pod on the aircraft's left wingtip 18 for views forward and to the left of the aircraft 10. Another similar two-camera pod is mounted on the aircraft's right wingtip 20 for views forward and to the right of aircraft 10.

In the cockpit 22 of the aircraft 10 the dashboard 24 carries an on-board annunciator panel 26 which signals the pilot of possible collision hazards by way of warning buzzers, lights or other means. The annunciator panel 26 is connected by cable 28 to a machine vision system processor 30 mounted in the aircraft 10, which is, in turn connected to the various cameras mounted on the aircraft 10 by cables.

Analysis of the operative functions of the machine vision system processor 30 involves recognition that the television camera images which are fed into the processor are made up of minute rectagular dots referred to as pixels. Thus, a black and white television camera pointed to the sky produces an image made up of an array of pixels of a uniform shade of gray. If an object appears in the field of view of the camera, pixels representing the location of the object are generated which have a shade of gray different from that of the neighboring pixels. The machine vision system processor 30 includes a computer which is programmed to identify such individual pixel contrasts, rapidly process the individual pixel electronic signals and find those in which the shade differs in a predetermined amount and/or arrangement from the surrounding pixels.

When an object is identified by the machine vision system processor 30 as a possible collision hazard electronic signals are sent by way of the connecting cable 28 to the annuciator panel 26 in the cockpit 22 of the aircraft 10. Thus, the pilot is notified by signals from the annunciator panel of potential collision problems to which he should be alerted. These can be specified, for instance, by programming so that an object's location would cause an arrow to point toward it or recreation of the object's size, position and shape on a television receiving monitor in the annunciator panel 26.

As examples of video cameras suitable for use in this invention, cameras such as model MV 9015-H from Circon are adequate for this purpose. Such a camera is connected to a machine vision and hardware package as available from ADS, Coreco or Viewflex Corporations and an IBM AT minicomputer, all installed in an aircraft. The system is programmed to identify obstacles, bring them to the pilot's attention for consideration, permit the pilot to cancel alarms resulting from clouds or distant ground features and to identify objects in which relative motion is characteristic of objects on collision courses with the machine vision equipped airplane.

The machine vision equipped aircraft has the video cameras installed to give views fore, aft, left, right, above and below the aircraft. The field of view of these cameras is established so that unobstructed scanning of all airspace beyond a cube 200 to 500 feet from the aircraft is assured. By adapting the system for infrared or other electromagnetic radiation wavelengths operation at night can be achieved as well as providing object identification through clouds.

Though particular examples of modes of operation and apparatus have been described heretofore this is meant not as limiting this invention but as illustrative only. The full extent of this invention is intended to cover all forms and modifications within the spirit of the claims in this matter.

What is claimed is:

1. A collision avoidance system for airplanes including:

television cameras, which create images of objects through correspondingly arranged pixels, positioned on an aircraft so as to view areas of potential collision; a machine vision system responsively connected to said television cameras;

an on-board annunciator display responsively connected to said machine vision system positioned to be viewed by the pilot of said aircraft;

wherein said machine vision system includes a computer programmed to identify correspondingly predetermined contrasting individual pixel arrangements as collision hazards which cause alarm signals; and electronic means to send said alarm signals to said annunciator display.

2. A collision avoidance system for airplanes as defined in claim 1 wherein said television cameras produce an array of pixels which are a uniform shade until a predetermined object appears in the field of view and said viewed object causes a contrasting shade of pixels to be generated corresponding to its location in said camera field of view;

and said computer responsive thereto rapidly processes said contrasting shade of pixels to identify arrangements preprogrammed to cause said alarm signals to be sent to said annunciator display.

* * * * *